US012400770B1

(12) United States Patent
Tatenuma et al.

(10) Patent No.: US 12,400,770 B1
(45) Date of Patent: Aug. 26, 2025

(54) METHOD FOR EXTRACTING TECHNETIUM-99M FROM LOW SPECIFIC ACTIVITY MOLYBDENUM-99, METHOD FOR PRODUCING PHYSIOLOGICAL SALINE SOLUTION CONTAINING TECHNETIUM-99M USING EXTRACTION METHOD THEREOF, AND SYSTEM FOR RECOVERING TECHNETIUM-99M FROM NATURAL MOLYBDENUM

(71) Applicants: Chemical Design Labo. LLC, Mito (JP); Innovative Fuel Solutions LLC, North Las Vegas, NV (US)

(72) Inventors: Katsuyoshi Tatenuma, Mito (JP); Edward Mausolf, North Las Vegas, NV (US); Erik V. Johnstone, North Las Vegas, NV (US)

(73) Assignees: Chemical Design Labo. LLC, Mito (JP); Innovative Fuel Solutions LLC, North Las Vegas, NV (US)

( * ) Notice: Subject to any disclaimer, the term of this patent is extended or adjusted under 35 U.S.C. 154(b) by 0 days.

(21) Appl. No.: 18/858,182

(22) PCT Filed: Jun. 24, 2024

(86) PCT No.: PCT/JP2024/022706
§ 371 (c)(1),
(2) Date: Oct. 18, 2024

(30) Foreign Application Priority Data

May 7, 2024 (JP) ................................ 2024-075307

(51) Int. Cl.
*G21G 1/00* (2006.01)

(52) U.S. Cl.
CPC ..... *G21G 1/001* (2013.01); *G21G 2001/0042* (2013.01)

(58) Field of Classification Search
CPC .......... G21G 1/001; G21G 2001/0036; G21G 2001/0042; G21G 1/06; B01D 5/267;
(Continued)

(56) References Cited

U.S. PATENT DOCUMENTS 4,416,860 A * 11/1983 Heitkamp .......... B01J 20/28004 423/6
9,236,153 B2 1/2016 Tatenuma et al.
(Continued)

FOREIGN PATENT DOCUMENTS

JP 2011-2370 A 1/2011
JP 5427483 B2 2/2014
(Continued)

OTHER PUBLICATIONS

Gu, Baohua, et al. "Efficient separation and recovery of technetium-99 from contaminated groundwater." Separations Technology 6.2 (1996): 123-132. (Year: 1996).*
(Continued)

*Primary Examiner* — Sharon M Davis
(74) *Attorney, Agent, or Firm* — Crowell & Moring LLP

(57) ABSTRACT

To extract technetium-99m from low-specific-activity molybdenum-99 in a short time without being influenced by the volume of molybdenum solution.
The method for recovering technetium-99m from low-specific-activity molybdenum-99 is a method in which the daughter nuclide technetium-99m produced through the decay of molybdenum-99 with a low specific activity contained in a high-concentration molybdenum solution containing the molybdenum-99 with a low specific activity is separated by using activated charcoal and recovered, and the method is characterized in that the activated charcoal is immersed into the molybdenum solution and selectively adsorbs a trace amount of technetium-99m in the solution,
(Continued)

even when molybdenum-99 is present 1016 times or more abundantly in terms of the ratio of the number of atoms.

4 Claims, 5 Drawing Sheets

(58) Field of Classification Search
CPC ................ B01J 2220/66; B01J 2220/82; B01J 2220/56; B01J 2220/62
USPC .......................................................... 210/633
See application file for complete search history.

(56) References Cited

U.S. PATENT DOCUMENTS

| | | | | |
|---|---|---|---|---|
| 2012/0090431 | A1* | 4/2012 | Tatenuma .......... | A61K 51/1282 266/168 |
| 2017/0203138 | A1* | 7/2017 | Anderson ................ | B01J 20/20 |
| 2022/0118420 | A1* | 4/2022 | Alhooshani .......... | B01J 20/2805 |

FOREIGN PATENT DOCUMENTS

| | | | |
|---|---|---|---|
| JP | 5916082 | B2 | 5/2016 |
| JP | 6355462 | B2 | 7/2018 |
| WO | WO 2010/146722 | A1 | 12/2010 |

OTHER PUBLICATIONS

English Translation of C2 (Written Opinion (PCT/ISA/237) issued in PCT Application No. PCT/JP2024/022706 dated Aug. 6, 2024) filed on Oct. 18, 2024 (4 pages).
Corresponding Japanese Office Action dated Jun. 4, 2024 with English Translation (6 pages).
Corresponding Japanese Decision to Grant dated Jun. 18, 2024 with English Translation (6 pages).
International Search Report (PCT/ISA/220 & PCT/ISA/210) issued in PCT Application No. PCT/JP2024/022706 dated Aug. 6, 2024 (5 pages).
Japanese-Language Written Opinion (PCT/ISA/237) issued in PCT Application No. PCT/JP2024/022706 dated Aug. 6, 2024 (3 pages).

* cited by examiner

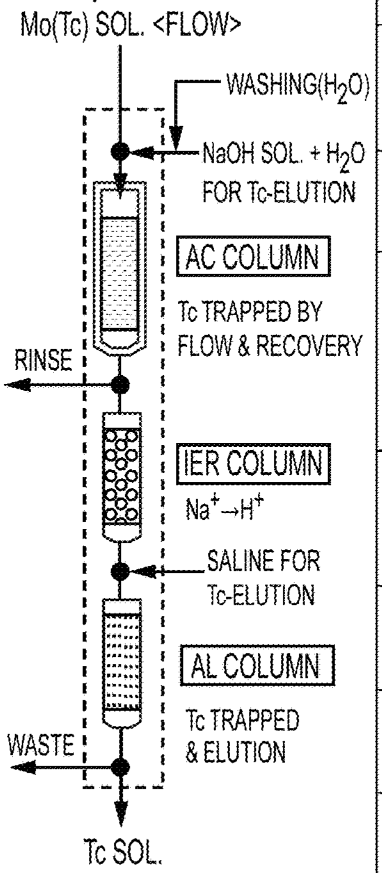

| TcMM TYPE | BASIC TcMM-1000 FLOW METHOD | IMPROVED TcMM-1000 BATCH METHOD | COMPARISON |
|---|---|---|---|
| MAX. $^{99}Mo$ ACTIVITY POSSIBILITY OF INCREASE | 500 Ci DIFFICULT | >500 Ci EASY | FLOW << SEMI-BATCH |
| Mo AMOUNT & SOL. | 1000g(Mo)/4L | >1.0-5.0kg(Mo) / >10-20L | FLOW < SEMI-BATCH |
| [AC COLUMN] AC AMOUNT, FLOW RATE, TIME REQUIRED | 5g, 100mL/MIN, 40 MIN | 5g, $^{99m}Tc$ COLLECTION BY ALWAYS DIPPING STIRRING IN $^{99}Mo$ SOL, AC COLUMN CHANGE ~1 MIN | FLOW << SEMI-BATCH |
| IER AMOUNT AL AMOUNT, FLOW RATE | IER 5cc, AL 12g, 10mL/MIN | IER 5cc, AL 12g, 10mL/MIN | FLOW = SEMI-BATCH |
| $^{99m}Tc$ RECOVERY TIME | ~100 MIN | 10 MIN | FLOW << SEMI-BATCH |
| $^{99m}Tc$/SOL. $^{99m}Tc$ CONC. | 360 Ci/120mL (3.0 Ci/mL) | >360 Ci/120mL (>3.0 Ci/mL) | FLOW = SEMI-BATCH |
| WASTES | LIQUID 300 mL/RUN +AC, IER, AL COLUMN | LIQUID <300 mL/RUN +AC, IER, AL COLUMN | FLOW = SEMI-BATCH |

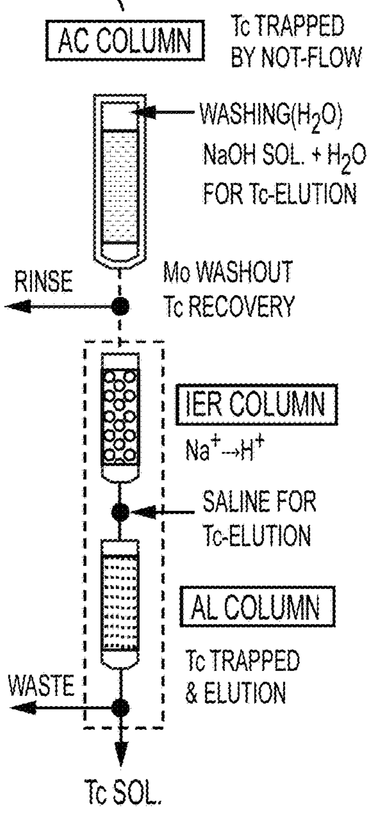

FIG. 4

PROCESS CONDITION OF IMPROVED-TcMM

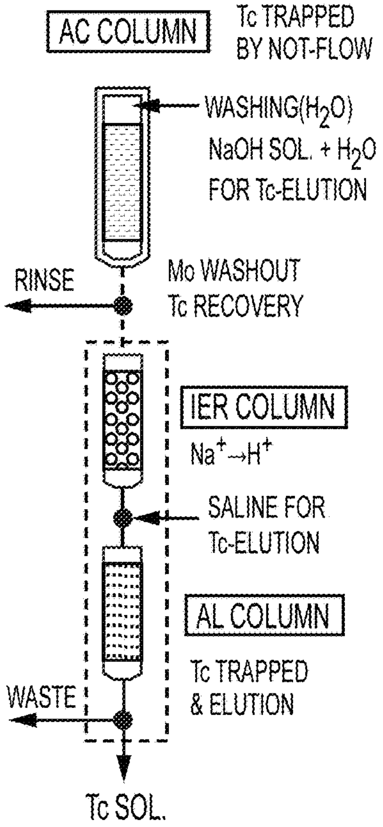

TcMM CONDITIONS

| TcMM TYPE | TcMM-1000 |
|---|---|
| $^{99}$Mo ACTIVITY | >500Ci |
| Mo AMOUNT<br>Mo SOL. | >1~5 kg(Mo)<br>>10~20 L |
| [AC COLUMN]<br>AC NaOH, RINSE | AC 5.0g (10-12cc)<br>NaOH, RINSE |
| [IER COLUMN]<br>DOWEX 50W-X8 | IER 10 cc |
| [AL COLUMN]<br>AL, SALINE | AL 10-20g (8-16cc)<br>SALINE 0.9%-NaCl |
| $^{99m}$Tc MILKING TIME | 10 MIN |
| $^{99m}$Tc CONC. | 1Ci/10mL-SALINE<br>(MAX. 20Ci/10mL) |
| WASTES<br>SOLID | LIQ. 126 mL/RUN<br>AC, IER, AL |

$^{99m}$Tc CAN BE RECOVERED IN ABOUT 10 MINUTES REGARDLESS OF THE AMOUNT OF Mo($^{99}$Mo).

FLOW RATE & TIME

| | STEP | VOL. mL | FLOW mL/MIN. | TIME MIN. |
|---|---|---|---|---|
| ① | AC-$^{99}$Mo FLOW (pH 8.0 ± 0.5) | >10-20L | DIPPING ADSORPTION | ALWAYS |
| ② | AC SET RINSE BY $H_2O$ | 50 | 50 (MAX. 200) | 1 + 1 MIN |
| ③ | NaOH(6M) | 15 | 10 | 1.5 MIN |
| ④ | REMOVE EXCESS NaOH BY $H_2O$ | 9.0 | 10 | 0.9 MIN |
| ⑤ | ELUTE $^{99m}$Tc BY $H_2O$ (AC→AL) | 50 | 10 | 5 MIN |
| ⑥ | WASH AL BY 1%-NaCl | 2 | 10 | 0.2 MIN |
| ⑦ | $^{99m}$Tc RECOVERY BY 1%-NaCl | 10 | 10 | 1 MIN |

LIQUID WASTE 126mL/RUN $^{99m}$Tc MILKING TIME ABOUT 10 MIN

FIG. 5

METHOD FOR EXTRACTING TECHNETIUM-99M FROM LOW SPECIFIC ACTIVITY MOLYBDENUM-99, METHOD FOR PRODUCING PHYSIOLOGICAL SALINE SOLUTION CONTAINING TECHNETIUM-99M USING EXTRACTION METHOD THEREOF, AND SYSTEM FOR RECOVERING TECHNETIUM-99M FROM NATURAL MOLYBDENUM

TECHNICAL FIELD

The present invention relates to processes and systems for the recovery, enrichment, and purification and separation of a radiopharmaceutical made from low-specific-activity radioactive molybdenum-99 ($^{99}$Mo) and of radioactive technetium-99m ($^{99m}$Tc) as a raw material for a labeling compound for the radiopharmaceutical.

BACKGROUND ART

Tc (technetium) is a transition metal with atomic number 43 positioned in group 7 and period 5. One of the isotopes of Tc, $^{99m}$Tc (technetium-99m) emits only γ (gamma) rays with a short half-life (6 hours) suitable for diagnostic imaging and weak energy (140 keV) suitable for external counting and, furthermore, is produced using a generator (a $^{99}$Mo/$^{99m}$Tc generator) that utilizes radioactive equilibrium with $^{99}$Mo (molybdenum-99) and is widely used in diagnostic imaging in nuclear medicine. Because of its short half-life, $^{99m}$Tc is usually used by the method of first acquiring its parent nuclide, $^{99}$Mo (a half-life of 66 hours), and then obtaining $^{99m}$Tc from $^{99}$Mo.

As a method for acquiring $^{99}$Mo, the fission method (nuclear fission method) has been used worldwide as a practical technique, in which $^{99}$Mo with a very high specific activity (level of radioactivity per unit mass of a substance containing a radioisotope) manufactured by utilizing a nuclear fission method by neutron irradiation of fissile uranium ($^{235}$U) is produced and used after separation from the simultaneously produced nuclear fission product. In that case, the method of acquiring $^{99m}$Tc by using aluminum oxide (alumina), which is commonly used for medical purposes, as an adsorbent for $^{99}$Mo because of the high specific activity of $^{99}$Mo, making the adsorbent hold Mo ($^{99}$Mo) up to its saturated adsorption capacity for Mo, and then eluting the daughter nuclide of $^{99}$Mo, $^{99m}$Tc, produced from the Mo ($^{99}$Mo) adsorbed on the alumina column using physiological saline (milking) has been used as an actual manufacturing technique.

Meanwhile, there is also the method of using a molybdenum compound, rather than uranium, as the starting material to obtain $^{99}$Mo, in which the desired $^{99}$Mo is produced by utilizing a neutron activation (n, γ) reaction (a neutron capture reaction in which a substance irradiated with neutrons n undergoes a nuclear reaction and transforms into a radioactive substance while emitting γ rays) of $^{98}$Mo, which is contained in the molybdenum compound as one of isotopes. The $^{99}$Mo produced in this (n, γ) method has a specific activity of approximately 1/10,000th, which is extremely low compared with that in the fission method, which means that putting the (n, γ) method into practical use requires separating a trace amount of $^{99m}$Tc as a daughter nuclide produced from a trace amount of $^{99}$Mo included in a large amount of nonradioactive Mo and purifying and recovering the separated $^{99m}$Tc. Methods known to have previously been studied or put into practical use as (n, γ) methods include the sol-gel method, the MEK method, and the sublimation method. The present inventors have independently developed and proposed the PZC (polyzirconium compound) method, a type of sol-gel method as an (n, γ) method.

In PTL 1, there are described the method and device for purifying $^{99m}$Tc-recovered liquid by: producing radioactive molybdenum $^{99}$Mo, a parent nuclide of technetium, through an (n, γ) reaction of $^{98}$Mo by subjecting natural isotopic Mo as a starting material to neutron irradiation in a nuclear reactor; passing a Mo solution containing the $^{99}$Mo through an activated charcoal (AC) column to make $^{99m}$Tc, a daughter nuclide of $^{99}$Mo, selectively adsorbed onto the AC to have the collection of the $^{99m}$Tc; washing away Non-AC-adsorbable Mo (including $^{99}$Mo) remaining in spaces in the AC column or pores in the AC with water; then eluting $^{99m}$Tc adhering to the AC from the AC using an alkali (e.g., caustic soda NaOH) solution; and further passing the Mo, $^{99}$Mo, and radioactive and other impurities contained in the $^{99m}$Tc-recovered liquid through an AL column packed with aluminum oxide (alumina) and placed after the AC column to thereby remove them.

In PTL 2, there are described the method and device for purifying $^{99m}$Tc-recovered liquid by: considering the method of producing $^{99}$Mo through an (n, γ) reaction of $^{98}$Mo by subjecting natural isotopic Mo as a starting material to neutron irradiation in a nuclear reactor and recovering its daughter nuclide, $^{99m}$Tc, using bead-shaped activated charcoal (BAC) as in PTL 1 and the method of passing a Mo solution containing $^{99}$Mo through an AC column by pressurized flow, in which the solution is pushed into the column using a pump, or reduced-pressure flow, in which the solution is pulled into the column using a pump, in comparison with each other; then considering the method of accelerating elution by heating to approximately 80° C. as a method for washing away non-AC-adsorbable Mo (including $^{99}$Mo) remaining in spaces in the AC column or pores in the AC with water and then eluting $^{99m}$Tc adsorbed on the AC from the AC using an alkali (e.g., caustic soda NaOH) solution; and thereafter removing the Mo, $^{99}$Mo, and radioactivated and other impurities contained in the $^{99m}$Tc-recovered liquid by an AL-packed column placed after the AC column.

In PTL 3, as in PTL 1 and 2, as the method of producing $^{99}$Mo through an (n, γ) reaction of $^{98}$Mo by subjecting natural isotopic Mo as a starting material to neutron irradiation in a nuclear reactor, and recovering its daughter nuclide, $^{99m}$Tc, using AC, there are described the method and device for purifying $^{99m}$Tc-recovered liquid, wherein the recovery primarily involves using a structure in which $^{99m}$Tc is selectively adsorbed and collected while radiation leakage to the outside is prevented. In this structure, a tank for the Mo solution containing $^{99}$Mo is placed inside a double-wall cell to shield γ rays and other radiation emitted from the $^{99}$Mo and to prevent the leakage of radioactive substances, and this tank is connected to an external cell having low radiation shielding capability and housing the AC column in it. The Mo solution is circulated in such a manner that it is routed to the AC column placed in the external cell and returns again to the internal Mo solution tank. Then non-AC-adsorbable Mo (including $^{99}$Mo) remaining in spaces in the AC column or pores in the AC is washed away with water, and then $^{99m}$Tc adsorbed on the AC is eluted from the AC using an alkali (e.g., caustic soda NaOH) solution. Lastly, the Mo, $^{99}$Mo, and radioactive and other impurities contained in the $^{99m}$Tc-recovered liquid are made to pass through an AL-packed column placed after the AC column to thereby remove them.

CITATION LIST

Patent Literature

[PTL 1] Japanese Patent No. 5427483
[PTL 2] Japanese Patent No. 5916082
[PTL 3] Japanese Patent No. 6355462

SUMMARY OF INVENTION

Technical Problem

In the known technologies described in PTL 1 to 3, in order to recover $^{99m}$Tc produced in a Mo solution containing $^{99}$Mo, AC capable of selectively adsorbing $^{99m}$Tc is packed and contained inside a cylindrical metal container (column) connected to components for the Mo solution to flow in and out, and the Mo solution is passed through this column.

In the known approach, in order to completely adsorb and collect the $^{99m}$Tc contained in the Mo solution by passing the solution through the AC column, it is necessary to impose a limitation on the flow rate of the Mo ($^{99}$Mo) solution flowing through the flow-type AC column. Specifically, a low-specific-activity Mo solution has a low $^{99}$Mo concentration, and thus recovering the desired amount of $^{99m}$Tc from it requires passing a large volume of Mo ($^{99}$Mo) solution through the AC column. For example, when the maximum flow rate per unit time through an AC column packed with 5 g of AC is from 50 to 100 mL/min, passing 2.0 L of Mo ($^{99}$Mo) solution requires a time of 20 to 40 minutes or more. Recovering $^{99m}$Tc, which has a short half-life, in a short time and using it for diagnosis, therefore, will face the challenge of operational efficiency.

However, when the volume of the Mo ($^{99}$Mo) solution is, for example, from 5 to 20 L, the time required to pass the solution through the AC column for the absorption and collection of $^{99m}$Tc is 2 to 5 hours or more, which decreases the operational efficiency, potentially causing the recovered $^{99m}$Tc, which has a short half-life, to alter and turn into $^{99T}$c, making it unusable as a pharmaceutical raw material. It should be noted that $^{99}$Tc (technetium-99 ground state) is one of the radioisotopes of Tc produced from $^{99m}$Tc, has a half-life of 211,000 years, and is produced proportionally to the time elapsed after the extraction and separation of the pharmaceutical raw material $^{99m}$Tc, and too large an amount of it constitutes an impurity in the pharmaceutical raw material $^{99m}$Tc.

To recover technetium-99m ($^{99m}$Tc), a daughter nuclide of radioactive molybdenum-99 ($^{99}$Mo), produced through the decay of $^{99}$Mo from a high-concentration Mo solution containing $^{99}$Mo as a radioactive pharmaceutical raw material, AC, where a trace amount of $^{99m}$Tc can be selectively adsorbed and recovered even when Mo ($^{99}$Mo) is present $10^{16}$ times or more abundantly in terms of the ratio of the number of atoms, can be used.

When the approach of immersing an AC-containing cylindrical metal mesh into the Mo solution and causing the surrounding Mo solution to flow by stirring it to adsorb and collect the $^{99m}$Tc in the Mo solution is used as the method for selectively separating and recovering the daughter nuclide $^{99m}$Tc of $^{99}$Mo formed in the high-concentration Mo solution, there is no need to pass the solution through an AC column, which requires a limitation on the flow rate. That is, collecting the $^{99m}$Tc contained in the Mo solution by adsorbing it onto AC immersed in the Mo solution eliminates the necessity of taking a long time to pass the solution through an AC column.

Thus, an object of the present invention is to provide a method for extracting technetium-99m from low-specific-activity molybdenum-99 in a short time without being influenced by the volume of the molybdenum solution.

Solution to Problem

To solve the above problem, a method for recovering technetium-99m from low-specific-activity molybdenum-99 that is the present invention is a method of recovering the daughter nuclide technetium-99m produced through the decay of molybdenum-99 with a low specific activity contained in a high-concentration molybdenum solution by separating the technetium-99m using activated charcoal and is characterized in that activated charcoal is immersed into the molybdenum solution and selectively adsorbs a trace amount of technetium-99m in the solution, even when molybdenum is present $10^{16}$ times or more abundantly in terms of the ratio of the number of atoms.

In the above method for recovering technetium-99m from low-specific-activity molybdenum-99, the molybdenum solution is characterized by containing radionuclide molybdenum-99 produced through a neutron capture (n, $\gamma$) reaction of natural isotopic molybdenum.

In the above method for recovering technetium-99m from low-specific-activity molybdenum-99, the activated charcoal is characterized by being packed in a cylindrical metal mesh rather than a column, with which the flow rate is limited, and immersed into the molybdenum solution while the molybdenum solution is flowing as a result of being stirred.

Also, a method for producing a physiological saline solution containing technetium-99m that is the present invention, is characterized by including: washing, with water, molybdenum remaining in pores in activated charcoal onto which technetium-99m recovered in the above method for recovering technetium-99m from low-specific-activity molybdenum-99 has been adsorbed; passing a solution containing the technetium-99m eluted from the activated charcoal using an alkali solution through an IER column, which is a column packed with a strongly acidic cation-exchange resin, to remove the alkali component; further passing the solution through an AL column, which is a column packed with alumina, to trap the technetium-99m; and eluting the technetium-99m from the AL column using physiological saline, thereby achieving purification as a physiological saline solution containing technetium-99m from which impurities have been removed.

In the above method for producing a physiological saline solution containing technetium-99m, the containers for housing the activated charcoal, the IER column, and the AL column are characterized by being made with an autoclavable material.

Moreover, a system for recovering technetium-99m from natural molybdenum that is the present invention is characterized by including: means for producing a high-concentration molybdenum solution containing molybdenum-99 with a low specific activity produced through a neutron capture (n, $\gamma$) reaction of natural isotopic molybdenum; means for producing the daughter nuclide technetium-99m in the molybdenum solution through the decay of the molybdenum-99; means for packing activated charcoal into a cylindrical metal mesh rather than a column, with which the flow rate is limited, and immersing the activated charcoal into the molybdenum solution while the molybdenum solution is flowing as a result of being stirred; means for washing, with water, residual molybdenum-99 away from the activated charcoal onto which the technetium-99m has been adsorbed; means for eluting the technetium-99m from the water-washed activated charcoal using an alkali solution, passing the eluate through a strongly acidic cation-exchange resin column to remove the alkali component, and then passing the resulting solution through an alumina column, thereby trapping the technetium-99m; and means for eluting the technetium-99m from the alumina column using physiological saline, thereby recovering purified technetium-99m.

Advantageous Effects of Invention

According to the present invention, a high-concentration Mo solution containing radioactive $^{99}$Mo is produced, and this solution is allowed to stand for approximately 24 hours to achieve a state in which $^{99}$Mo and $^{99m}$Tc produced therefrom coexist in radioactive equilibrium (the parent and daughter nuclides are balanced at a constant ratio of radioactivity), and by immersing an AC-packed cylindrical metal mesh into the Mo solution while the solution is stirred and flowing, rather than passing the solution through an AC column as in the related art, $^{99m}$Tc can be constantly trapped by adsorbing it onto the AC.

Even if the volume of the high-concentration Mo solution is, for example, as small as 0.1 L or as large as 5 to 20 L, the intended amount of $^{99m}$Tc is selectively adsorbed and collected on the AC during the time it takes for $^{99m}$Tc to be produced from $^{99}$Mo and reach the radioactive equilibrium or the time until the desired amount of $^{99m}$Tc is produced, which is advantageous particularly for the recovery of $^{99m}$Tc, which has a short half-life (6 hours).

During the treatment for the desorption of $^{99m}$Tc adsorbed and collected on the AC in the cylindrical metal mesh, non-adsorbed Mo ($^{99}$Mo) remaining in the AC is also eluted, simultaneously with the $^{99m}$Tc; however, by passing the $^{99m}$Tc-containing eluate through an alumina column, high-purity $^{99m}$Tc can be produced and recovered as a pharmaceutical raw material without contamination by Mo ($^{99}$Mo) and other radioactive impurities.

BRIEF DESCRIPTION OF DRAWINGS

FIG. 4 is a diagram comparing the processes in a method for extracting technetium-99m from low-specific-activity molybdenum-99 that is the present invention and the processes in the known method.

FIG. 5 is a diagram illustrating process conditions for brief manufacturing in a method for producing a physiological saline solution containing technetium-99m that is the present invention.

DESCRIPTION OF EMBODIMENTS

Instead of recovering $^{99m}$Tc by passing a Mo solution containing $^{99}$Mo through an AC column, by keeping a cylindrical metal (e.g., stainless-steel) mesh packed with AC immersed in a $^{99}$Mo solution tank and causing the Mo solution with the AC mesh immersed therein to flow by stirring it, maintain a state in which the AC can adsorb $^{99m}$Tc constantly.

Recover high-purity $^{99m}$Tc by taking the AC mesh out from the Mo solution at a predetermined or any point in time, removing non-AC-adsorbable $^{99}$Mo remaining in pores in the AC by washing with water, and then treating the AC onto which $^{99m}$Tc has been adsorbed with an alkali solution to elute the $^{99m}$Tc collected by the AC and purifying this solution with a strongly acidic cation-exchange resin (IER) and alumina (AL).

Embodiments of the present invention will be described in detail with reference to drawings. It should be noted that $^{99m}$Tc represents the radionuclide technetium-99m, and $^{99}$Mo represents the radionuclide molybdenum-99. They have a relationship in which $^{99}$Mo is the parent nuclide, whereas $^{99m}$Tc is the daughter nuclide. AC stands for activated charcoal (carbon), IER stands for ion-exchange resin, and AL stands for alumina (aluminum oxide).

Figure 1:
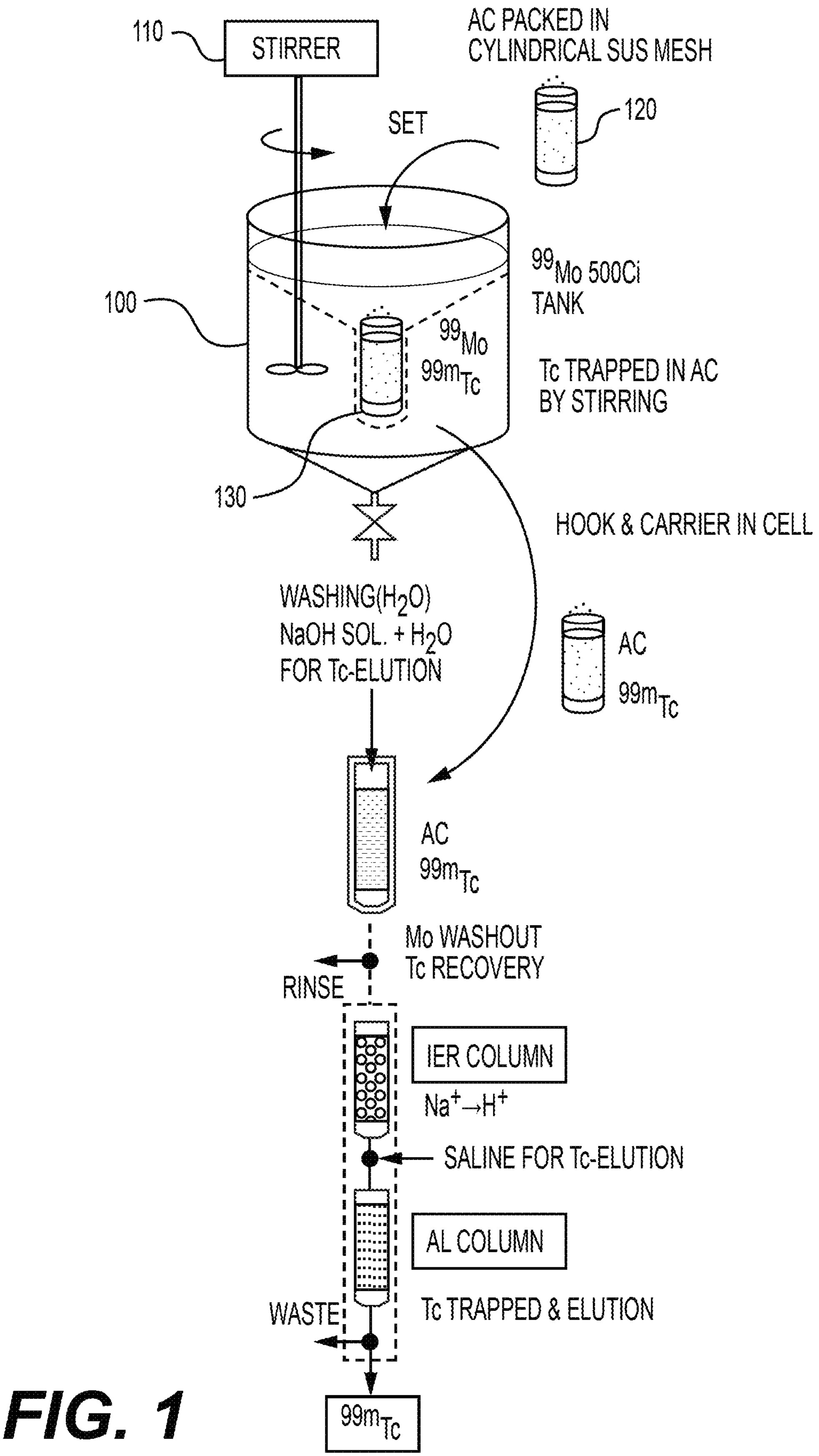
FIG. 1 is a diagram illustrating an outline of a method for extracting technetium-99m from low-specific-activity molybdenum-99 that is the present invention, a method for producing a physiological saline solution containing technetium-99m using the extraction method, and a system for recovering technetium-99m from natural molybdenum.
Figure 3:
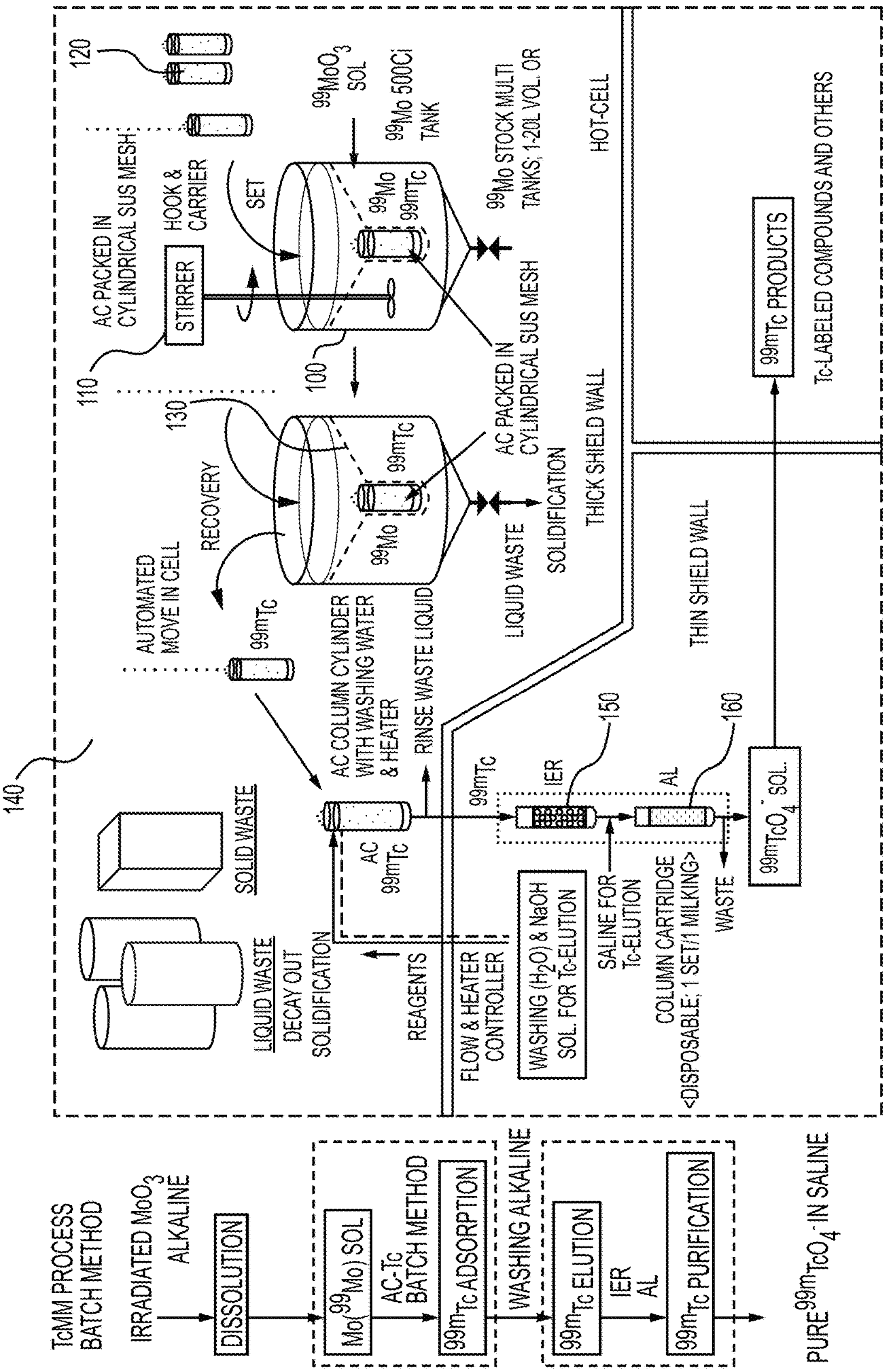
FIG. 3 is a diagram illustrating the structure of a method for extracting technetium-99m from low-specific-activity molybdenum-99 that is the present invention, a method for producing a physiological saline solution containing technetium-99m using the extraction method, and a system for recovering technetium-99m from natural molybdenum.

FIGS. 1 and 3 are diagrams illustrating a method for extracting technetium-99m from low-specific-activity molybdenum-99, a method for producing a physiological saline solution containing technetium-99m using the extraction method, and a system for recovering technetium-99m from natural molybdenum. Instead of the method of passing a Mo solution containing $^{99}$Mo through an AC column, $^{99m}$Tc in a Mo solution is adsorbed and collected using an AC-packed cylindrical metal mesh, through which $^{99m}$Tc is purified and recovered.

Figure 2:
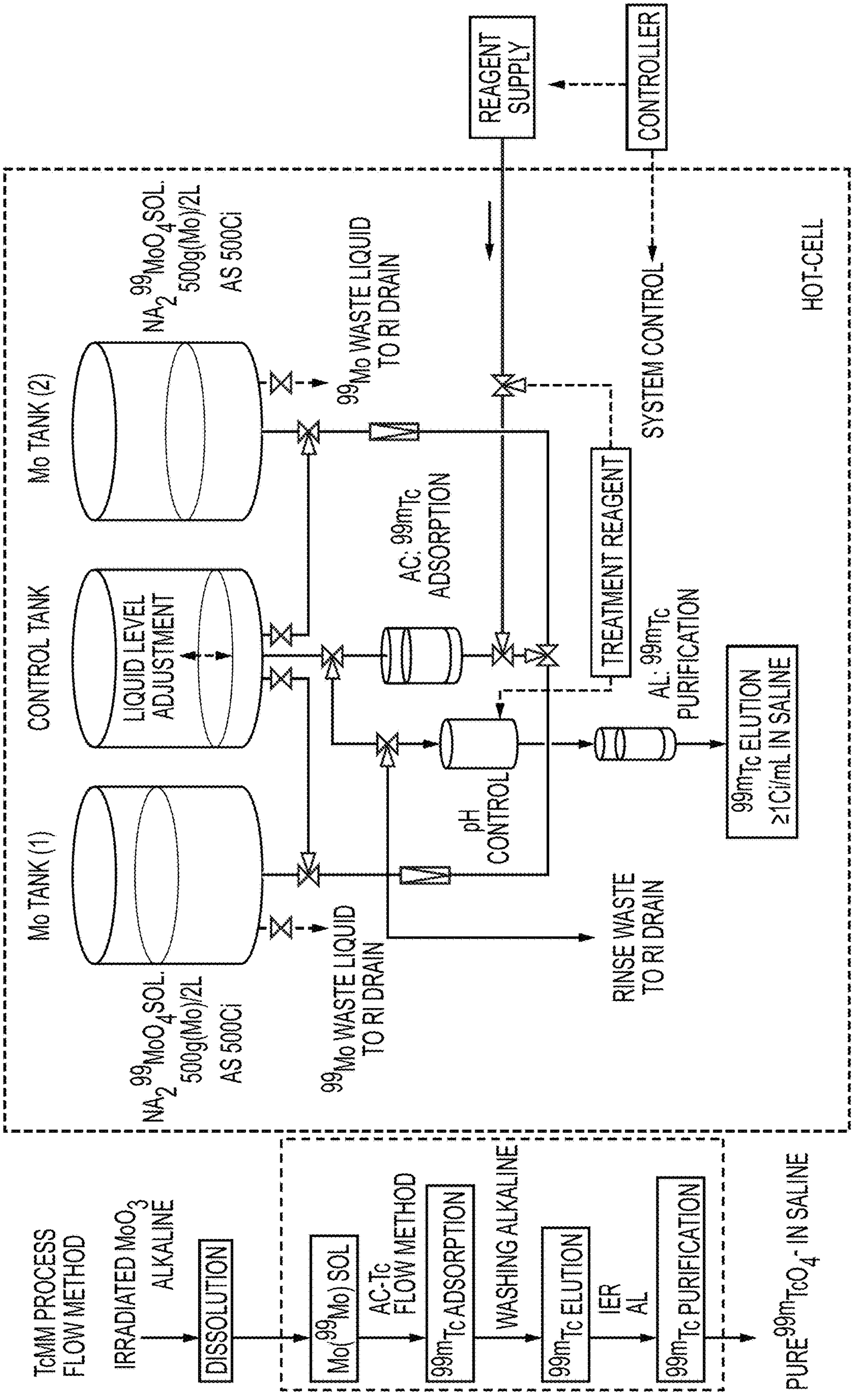
FIG. 2 is a diagram illustrating the known method for passing a molybdenum solution through an activated charcoal column.

FIG. 2 is a diagram illustrating the known method, passing a molybdenum solution through an activated charcoal column. FIG. 4 is a diagram comparing the processes in a method that is the present invention for extracting technetium-99m from low-specific-activity molybdenum-99 and in the known method. FIG. 5 is a diagram illustrating process conditions for brief manufacturing in a method for producing a physiological saline solution containing technetium-99m.

In the method for extracting technetium-99m from low-specific-activity molybdenum-99, the daughter nuclide technetium-99m produced through the decay of molybdenum-99 with a low specific activity contained in a high-concentration molybdenum solution is recovered by separating it using activated charcoal.

The activated charcoal is packed in a cylindrical metal mesh rather than a column, with which the flow rate is limited. The activated charcoal is immersed into the molybdenum solution while the solution is flowing as a result of being stirred, and selectively adsorbs a trace amount of technetium-99m in the molybdenum solution, even when molybdenum is present $10^{16}$ times or more abundantly in terms of the ratio of the number of atoms. It should be noted that the molybdenum solution contains the radionuclide molybdenum-99 produced through a neutron capture (n, $\gamma$) reaction of natural isotopic molybdenum.

In the method for producing a physiological saline solution containing technetium-99m, molybdenum remaining in pores in activated charcoal onto which technetium-99m recovered in the method for recovering technetium-99m from low-specific-activity molybdenum-99 has been adsorbed is washed with water. A solution containing the technetium-99m eluted from the activated charcoal using an alkali solution is passed through an IER column, which is a column packed with a strongly acidic cation-exchange resin, so that the alkali component will be removed. The solution is further passed through an AL column, which is a column packed with alumina, so that the technetium-99m will be trapped. The technetium-99m is eluted from the AL column using physiological saline. As a result, purification is achieved as a physiological saline solution containing technetium-99m from which impurities have been removed.

The system for recovering technetium-99m from natural molybdenum includes means for producing a high-concentration molybdenum solution containing molybdenum-99 with a low specific activity produced through a neutron capture (n, γ) reaction of natural isotopic molybdenum; means for producing the daughter nuclide technetium-99m in the molybdenum solution through the decay of the molybdenum-99; means for packing activated charcoal into a cylindrical metal mesh rather than a column, with which the flow rate is limited, and immersing the activated charcoal into the molybdenum solution while the solution is flowing as a result of being stirred; means for washing, with water, residual molybdenum-99 away from the activated charcoal onto which the technetium-99m has been adsorbed; means for eluting the technetium-99m from the water-washed activated charcoal using an alkali solution, passing the eluate through a strongly acidic cation-exchange resin column to remove the alkali component, and then passing the resulting solution through an alumina column, thereby trapping the technetium-99m; and means for eluting the technetium-99m from the alumina column using physiological saline, thereby recovering purified technetium-99m.

First Embodiment

As illustrated in FIG. 1, a tank 100 in which a Mo solution is stored is placed inside a hot cell, which blocks radiation, because of high radiation levels from $^{99}$Mo. The Mo solution tank 100 includes a stirrer 110 inside it as a function of stirring the solution and also has a support 130 for holding a cylindrical metal mesh 120 with AC housed in it in the solution. A plurality of tanks 100 may be placed inside the hot cell.

To produce the radioactive pharmaceutical raw material $^{99m}$Tc, an $Na_2{}^{99}MoO_4$ solution is supplied to the tank 100 as a Mo solution containing the radionuclide $^{99}$Mo. Prior neutron irradiation of natural isotopic $MoO_3$ in a nuclear reactor produces $^{99}$Mo. Dissolving $MoO_3$ containing $^{99}$Mo with an alkali (NaOH) solution yields an $Na_2{}^{99}MoO_4$ solution with a neutral pH.

The Mo solution containing radioactive $^{99}$Mo is a high-concentration Mo solution containing, for example, 500 g of Mo (750 g as $MoO_3$) in 2 L. To obtain approximately 500 Ci (curies) of $^{99m}$Tc once, a high-concentration Mo solution containing 500 g of Mo in 2 L is required. The solution, however, may alternatively be a high-concentration Mo solution containing 50 g of Mo (75 g as $MoO_3$) in one-tenth the volume, i.e., 200 mL, or a large volume of high-concentration Mo solution that contains 5 kg of Mo (7.5 kg as $MoO_3$) in ten times the volume, i.e., 20 L.

The cylindrical metal mesh 120 with AC housed in it is placed into the tank 100 to which the Mo solution containing $^{99}$Mo has been fed. With the metal mesh held in the Mo solution using the support 130, the Mo solution is stirred, for example using the stirrer 110 or a water flow created by a circulation pump. By maintaining this state, $^{99m}$Tc produced in the Mo solution is adsorbed and collected on the AC.

Since $^{99m}$Tc produced from $^{99}$Mo reaches a radioactive equilibrium state in approximately 24 hours, the cylindrical metal mesh 120 may be pulled up from the Mo solution after waiting for this transition time or may be pulled up at a certain time before the radioactive equilibrium is reached. During the period from the immersion of the cylindrical metal mesh 120 into the Mo solution until the pulling up, the AC can be used to adsorb $^{99m}$Tc.

As illustrated in FIG. 2, the known type of TcMM (technetium-99m master milker) adopts the approach of passing the entire volume of a Mo solution through an AC column to adsorb $^{99m}$Tc in the Mo solution onto the AC. The AC column is a cylindrical column packed with AC, in which a liquid comes into contact with the AC while flowing through the cylinder from the inlet to the outlet. Since this approach limits the flow rate of the Mo solution through the AC column, the capacity of the AC column to process the Mo solution is therefore limited, which is disadvantageous as a technology for recovering $^{99m}$Tc, whose half-life (term of existence) is short.

As illustrated in FIG. 3, the system for highly enriching and purifying and recovering $^{99m}$Tc from a low-specific-activity Mo-solution is placed inside a hot cell 140, which is isolated by thick shielding walls for blocking high levels of radiation. In advance, a $^{99}MoO_3$ solution is produced by dissolving radioactivated $^{99}MoO_3$ with an alkali. The $^{99}MoO_3$ solution is supplied to a plurality of storage tanks 100 with a capacity of 1 to 20 L installed inside the hot cell 140, storing a high-concentration Mo solution in which the radioactivity of $^{99}$Mo is 500 Ci.

Cylindrical metal meshes 120 in which AC is housed and contained are placed into the tanks 100 using a hook and a carrier or the like, and held in the Mo solution containing $^{99}$Mo with supports 130. It should be noted that the radioactive $^{99}$Mo decays into $^{99m}$Tc, through which the Mo solution turns into one that contains $^{99m}$Tc.

After the cylindrical metal meshes 120 are impregnated with the Mo solution, the Mo solution can be stirred with stirrers 110 so that the Mo solution will come into contact with the AC efficiently. This results in the adsorption and collection of $^{99m}$Tc produced in the Mo solution on the AC. The cylindrical metal meshes 120 are pulled up from the tanks 100, and the AC onto which $^{99m}$Tc has been adsorbed is recovered. Then $^{99}$Mo and other non-adsorbed substances remaining in the AC are removed by rinsing them away by housing the AC in a column and washing it with water.

An alkali (NaOH) solution is supplied to and passed through the AC-accommodating column while the flow rate and temperature are adjusted. The treatment with an alkali solution causes $^{99m}$Tc to be eluted from the AC into the alkali solution. The alkali solution containing the released $^{99m}$Tc is then passed through an IER column 150. In the IER column 150, the alkali component is trapped by a strongly acidic cation-exchange resin. The solution containing the released $^{99m}$Tc is then passed through an AL column 160.

In the AL column 160, $^{99m}$Tc is trapped by alumina, and impurities are released. Then physiological saline, having an NaCl concentration of 0.9% or so, is passed through the AL column 160, causing $^{99m}$Tc to be eluted from the alumina into the physiological saline. The $^{99m}$Tc is released in the form of a $^{9m}TcO_4^-$ solution together with the physiological saline, and thus it is recovered as a physiological saline solution containing $^{99m}$Tc purified to a high purity. The recovered $^{99m}$Tc serves as a raw material for radiopharmaceuticals and labeling compounds.

As for the waste materials and waste liquids generated during the process of obtaining and recovering high-purity $^{99m}$Tc from a high-concentration Mo solution, solidification and other treatments can be performed after reducing the radioactivity adhering to them to low levels through natural decay. There may be provided a space in the hot cell 140 or elsewhere for storing and containing various radioactive or nonradioactive waste materials, for example, generated in association with the treatments.

For the containers for housing the AC (the cylindrical metal meshes 120 and the AC-accommodating column for washing the AC with water in it), the IER column 150, and the AL column 160, it is preferred that their materials and contents (AC, IER, and AL) be autoclavable (121° C. and 2 atm).

As illustrated in FIG. 4, the processes in the known approach and those in the present invention are compared. The known approach is a flow-type TcMM, which adsorbs and collects $^{99m}$Tc contained in a Mo solution by passing the solution through an AC column. The present invention is a batch-type, modified TcMM, which causes $^{99m}$Tc produced in a Mo solution to be adsorbed onto AC by immersing a cylindrical metal mesh 120 in which the AC is housed and contained into a flowing high-concentration Mo solution, rather than passing the Mo solution through an AC column.

In the known approach, to completely adsorb and collect the $^{99m}$Tc contained in the Mo solution by passing the Mo solution through the AC column requires, it is necessary to impose a flow-rate limitation on the AC column to allow the Mo solution to flow through it. Specifically, a low-specific-activity Mo solution has a low $^{99}$Mo concentration, so, to recover the desired amount of $^{99m}$Tc from it, it is necessary to pass a large volume of Mo solution through the AC column. For example, when the maximum flow rate per unit time through the AC column is set to 50 to 100 mL/min, passing 2.0 L of Mo solution requires a time of 20 to 40 minutes or more, which is not efficient to recover $^{99m}$Tc, which has a short half-life, in a short time for diagnostic use.

Furthermore, in the case of a low-concentration Mo solution, the concentration of the resulting $^{99m}$Tc is lower. The adsorption and collection of $^{99m}$Tc using the AC column, therefore, requires passing a larger volume of Mo solution through the AC column. For example, when the volume of the Mo solution is from 5 to 20 L, the time required to pass the solution through the AC columns is 2 to 5 hours or more, in which case the recovered $^{99m}$Tc may alter and turn into $^{99}$Tc, making it unusable as a pharmaceutical raw material.

In the present invention, by contrast, the AC housed in the cylindrical metal mesh 120 is capable of selectively separating and recovering a trace amount of daughter nuclide $^{99m}$Tc produced through the decay of $^{99}$Mo in a high-concentration Mo solution containing radioactive $^{99}$Mo, even when $^{99}$Mo is present $10^{16}$ times or more abundantly in terms of the ratio of the number of atoms to $^{99m}$Tc.

Immersing the cylindrical metal mesh 120 containing AC into the Mo solution and stirring the Mo solution to flow around the cylindrical metal mesh 120 facilitates the adsorption of $^{99m}$Tc in the Mo solution onto the AC. There is no need to adjust the flow rate of the Mo solution to pass it through an AC column. Since $^{99m}$Tc is constantly adsorbed onto the AC from the entire Mo solution present around the cylindrical metal mesh 120, the collection of $^{99m}$Tc in a short time is possible.

As illustrated in FIG. 5, the time required for each of the steps of immersing a cylindrical metal mesh 120 in which AC is stored and contained into a Mo solution and recovering $^{99m}$Tc purified as a pharmaceutical raw material from the AC onto which the $^{99m}$Tc has been adsorbed and collected is significantly shortened compared with the known approach. Since the AC constantly adsorbs and collects $^{99m}$Tc regardless of the volume of the Mo solution or the radioactivity of $^{99}$Mo, the process time required for it is zero. The duration of the subsequent purification and recovery of $^{99m}$Tc from the AC is approximately 10 minutes, which means that the operations can always be performed within a constant length of time and through the same process. This method, therefore, is optimum as a technology for pharmaceutical raw material manufacturing, which requires stringent quality and preparedness for shipping.

Second Embodiment

An Mo solution (10 L) with a pH of 8 to 9 was prepared by dissolving $MoO_3$ (3,750 g) containing a very large amount of Mo (2,500 g) in a 6 M (molarity, mol/L) NaOH (1.75 to 1.8 L) solution and then adding $H_2O$. This Mo solution was placed into a beaker with a capacity of 15 L, and 0.1 mg of Re (rhenium) was added as an alternative element to $^{99m}$Tc (500 Ci). A cylindrical metal mesh (diameter: 1.6 cm; length: 6 cm; capacity: 12 cc), which was a stainless-steel mesh, packed with AC (4.5 g) was immersed into this Mo solution and stirred by rotating the rotary blades of a stirrer in the Mo solution for 6 hours (30 rpm). After stirring, the cylindrical metal mesh was taken out from the Mo solution container, washed with water to remove non-adsorbed Mo remaining in pores in the AC by washing them away, and the Re adsorbed on the AC was eluted from the AC with a 1.3 M NaOH solution (30 mL). The eluate was passed through an IER column, packed with a strongly acidic cation-exchange resin, and then through an AL column, in which activated alumina (6 g) was stored, through which Re was trapped by adsorption onto the alumina. Twenty milliliters of physiological saline (0.9% NaCl solution) was passed through the AL column in which Re was adsorbed. In this manner, a physiological saline solution containing Re (pH: 4.8 to 5.2) was recovered.

It should be noted that the half-life of $^{99}$Mo is 65.94 hours, and the half-life of $^{99m}$Tc is 6.01 hours. The amount of $^{99}$Mo (500 Ci) was 1.04 mg, 1/500,000th in relation to Mo (500 g), and the amount of $^{99m}$Tc (500 Ci) was 0.095 mg, 1/5,000,000th in relation to Mo (500 g). At the μCi test level, the radioactivity of $^{99}$Mo was less than $5\times10^4$ Bq (becquerels), with the ratio by weight to Mo (500 g) being smaller than $6e^{-15}$, and the radioactivity of $^{99m}$Tc was less than $6\times10^4$ Bq (becquerels), with the ratio by weight to Mo (500 g) being smaller than $6e^{-16}$. A TcMM test consisting of a high(wide)-range hot run from μCi levels to 80-Ci levels and a cold run equivalent to 500 Ci (500 g or more of Mo) was performed, with the result that the coefficient of separation between Mo and Tc with Ac (selective adsorption of Tc) was $10e^{16}$ or greater.

The amount of recovered Re was from 0.092 to 0.096 mg, and the recovery rate for Re was approximately 94%. Given that the Re was equivalent to $^{99m}$Tc (500 Ci), the inventors believe that the adsorption and collection of $^{99m}$Tc with AC by immersing a cylindrical metal mesh packed with AC into a Mo solution would yield similar results. These results indicate that AC selectively adsorbs a trace amount of the daughter nuclide $^{99m}$Tc produced through the decay of $^{99}$Mo in a high-concentration Mo solution, even when $^{99}$Mo is present $10^{16}$ times or more abundantly in terms of the ratio of the number of atoms to $^{99m}$Tc.

According to the present invention, a high-concentration Mo solution containing radioactive $^{99}$Mo is produced, and this solution is allowed to stand for approximately 24 hours to achieve a state in which $^{99}$Mo and $^{99m}$Tc produced therefrom coexist in radioactive equilibrium (the parent and daughter nuclides are balanced at a constant ratio of radioactivity). By immersing an AC-packed cylindrical metal mesh into the Mo solution while the solution is stirred and flowing, rather than passing the solution through an AC column as in the related art, $^{99m}$Tc can be constantly trapped by adsorbing it onto the AC.

Even if the volume of the high-concentration Mo solution is, for example, as small as 0.1 L or as large as 5 to 20 L, the intended amount of $^{99m}$Tc is selectively adsorbed and collected on the AC during the time it takes for $^{99m}$Tc to be produced from $^{99}$Mo and reach the radioactive equilibrium or the time until the desired amount of $^{99m}$Tc is produced, which is advantageous particularly for the recovery of $^{99m}$Tc, which has a short half-life (6 hours).

During the treatment for the desorption of $^{99m}$Tc adsorbed and collected on the AC in the cylindrical metal mesh, non-adsorbed Mo ($^{99}$Mo) remaining in the AC is also eluted, simultaneously with the $^{99m}$Tc; however, by passing the $^{99m}$Tc-containing eluate through an alumina column, high-purity $^{99m}$Tc can be produced and recovered as a pharmaceutical raw material without contamination by Mo ($^{99}$Mo) and other radioactive impurities.

While embodiments of the present invention have been described above, the present invention is not limited thereto.

REFERENCE SIGNS LIST

100: Mo solution tank
110: Stirrer
120: Cylindrical metal mesh
130: Support
140: Hot cell
150: IER column
160: AL column

The invention claimed is:

1. A method for separating technetium-99m from molybdenum-99, the method comprising:
- providing a molybdenum-99 solution in which the molybdenum-99 decays into the technetium-99m;
- immersing a sorbent body comprising activated charcoal packed within a cylindrical metal mesh in the solution;
- stirring the solution; and
- selectively adsorbing a trace amount of the technetium-99m in the activated charcoal.

2. The method of claim 1, further comprising:
- producing the molybdenum-99 by a neutron capture reaction (n, γ) of natural isotopic molybdenum.

3. A method for producing a physiological saline solution containing technetium-99m, the method comprising:
- performing the method of claim 1; then
- washing, with water, the activated charcoal adsorbed with the technetium-99m to remove remaining molybdenum-99;
- eluting the technetium-99m adsorbed in the activated charcoal with an alkali solution to produce an alkali solution containing the technetium-99m;
- passing the alkali solution containing the technetium-99m through an IER column packed with a strongly-acidic cation exchange resin to remove the alkali component;
- passing an eluent from the IER column through an alumina column trapping the technetium-99m in the alumina column; and
- eluting the technetium-99m from the alumina column using physiological saline, thereby providing the physiological saline solution containing technetium-99m.

4. A method for recovering technetium-99m from natural molybdenum, the method comprising:
- producing molybdenum-99 by a neutron capture reaction (n, γ) of the natural molybdenum;
- dissolving the molybdenum-99 into a solution in which the molybdenum-99 decays into the technetium-99m;
- immersing a sorbent body comprising activated charcoal packed within a cylindrical metal mesh in the solution;
- stirring the solution;
- selectively adsorbing a trace amount of the technetium-99m in the activated charcoal;
- washing, with water, the activated charcoal adsorbed with the technetium-99m to remove remaining molybdenum-99;
- eluting the technetium-99m adsorbed in the activated charcoal with an alkali solution to produce an alkali solution containing the technetium-99m;
- passing the alkali solution containing the technetium-99m through an IER column packed with a strongly-acidic cation exchange resin to remove the alkali component;
- passing an eluent from the IER column through an alumina column trapping the technetium-99m in the alumina column; and
- eluting the technetium-99m from the alumina column using physiological saline, thereby providing a physiological saline solution containing technetium-99m.

* * * * *